(12) United States Patent
Elsaid Ibrahim et al.

(10) Patent No.: US 10,095,892 B2
(45) Date of Patent: Oct. 9, 2018

(54) RFID READER AND METHOD FOR RECOGNIZING RFID TAGS

(71) Applicants: Fraunhofer-Gesellschaft zur Foerderung der angewandten Forschung e.V., Munich (DE); Friedrich-Alexander-Universitaet Erlangen-Nuemberg, Erlangen (DE)

(72) Inventors: Hazem Elsaid Ibrahim, Erlangen (DE); Hamed Kenawy, Erlangen (DE); Joerg Robert, Uttenreuth (DE); Albert Heuberger, Erlangen (DE); Wolfram Strauss, Nuremberg (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 15/430,130

(22) Filed: Feb. 10, 2017

(65) Prior Publication Data

US 2017/0235979 A1 Aug. 17, 2017

(30) Foreign Application Priority Data

Feb. 12, 2016 (EP) .................................. 16155476

(51) Int. Cl.
| | |
|---|---|
| *G06K 7/10* | (2006.01) |
| *H04Q 3/00* | (2006.01) |
| *H04B 7/00* | (2006.01) |
| *H04Q 5/22* | (2006.01) |

(52) U.S. Cl.
CPC ................................ *G06K 7/10029* (2013.01)

(58) Field of Classification Search
CPC ... G06K 7/10; H04Q 3/00; H04Q 5/22; H04B 7/00
USPC ........... 340/10.1–10.5, 3.41, 572.1; 370/314, 370/347, 348; 235/385
See application file for complete search history.

(56) References Cited

U.S. PATENT DOCUMENTS

| | | | | |
|---|---|---|---|---|
| 8,085,131 B2 * | 12/2011 | Park | ...................... | H04W 28/06 340/10.1 |
| 8,477,016 B2 * | 7/2013 | Seo | ..................... | G06K 7/10049 340/10.2 |
| 8,610,544 B2 * | 12/2013 | Jang | ...................... | H04W 28/06 235/385 |

(Continued)

OTHER PUBLICATIONS

Angerer, Christoph et al., "RFID Reader Receivers for Physical Layer Collision Recovery", IEE Transactions on Communications vol. 58, No. 12, Dec. 2010, 3526-3537.

(Continued)

*Primary Examiner* — Nam V Nguyen
(74) *Attorney, Agent, or Firm* — Perkins Coie LLP; Michael A. Glenn (57) ABSTRACT

An RFID reader includes a transmitter, a receiver, and an evaluator. The receiver receives signals from RFID tags within a given number of slots of a time frame with a given frame size and provides a number of successful slots and a number of collided slots. The evaluator sets a modified frame size based on an estimated number of RFID tags which is determined based on the frame size, the number of successful slots, and the number of collided slots. The invention also refers to a corresponding method.

6 Claims, 7 Drawing Sheets

(56) References Cited

U.S. PATENT DOCUMENTS

| | | | | |
|---|---|---|---|---|
| 8,798,540 | B2* | 8/2014 | Choi | G06K 7/10039 340/572.1 |
| 9,007,180 | B2* | 4/2015 | Lee | G06K 7/10049 340/10.2 |
| 9,680,512 | B2* | 6/2017 | Chen | H04B 1/12 |
| 9,773,132 | B2* | 9/2017 | Lee | G06K 7/10029 |
| 9,881,187 | B2* | 1/2018 | Elsaid Ibrahim | G06K 7/10069 |
| 2004/0046642 | A1* | 3/2004 | Becker | G01V 15/00 340/10.32 |
| 2009/0134975 | A1* | 5/2009 | Eom | G06K 7/0008 340/10.2 |
| 2010/0019883 | A1* | 1/2010 | Eom | G06K 7/0008 340/10.1 |
| 2010/0039237 | A1* | 2/2010 | Radhakrishnan | G06K 7/10029 340/10.4 |
| 2013/0222118 | A1* | 8/2013 | Felemban | G06K 7/01 340/10.2 |

OTHER PUBLICATIONS

Chen, Wen-Tzu, "An Accurate Tag Estimate Method for Improving the Performance of an RFID Anticollision Algorithm Based on Dynamic Frame Length Aloha", IEEE Transactions on Automation Science and Engineering vol. 6, No. 1, Jan. 2009, 9-15.

Li, Bo et al., "Efficient Anti-Collision Algorithm Utilizing the Capture Effect for ISO 18000-6C RFID Protocol", IEEE Communications Letters vol. 15, No. 3, Mar. 2011, 352-354.

Salah, Hamed et al., "A Time and Capture Probability Aware Closed Form Frame Slotted Aloha Frame Length Optimizaiton", IEEE Communications Letters vol. 19, No. 11, Nov. 2015, 2009-2012.

Schoute, Frits C., "Dvnamic Frame Length Aloha", IEEE Transactions on Communications vol. Com-31, No. 4, Apr. 1983, 565-568.

Solic, Petar et al., "Energy Efficient Tag Estimation Method for Aloha-Based RFID Systems", IEEE Sensors Journal vol. 14, No. 10, Oct. 2014, 3637-3647.

Solic, Petar et al., "Linearized Combinatorial Model For Optimal Frame Selection in Gen2 RFID System", IEEE International Conference on RFID (RFID), 2012, 89-94.

Vahedi, Ehsan et al., "Probabilistic Analysis and Correction of Chen's Tag Estimate Method", IEEE Transactions on Automation Science and Engineering vol. 8, No. 3, Jul. 2011, 659-663.

Vogt, Harald, "Efficient Object Identification With Passive RFID Tags", Department of Computer Science Swiss Federal Institute of Technology (ETH), 2002, 16 pages.

Vogt, Harald, "Multiple Object Identification With Passive RFID Tags", Department of Computer Science Swiss Federal Institute of Technology (ETH), Oct. 2002, 6 pages.

Zanella, Andrea, "Estimating Collision Set Size in Framed Slotted Aloha Wireless Networks and RFID Systems", The Final Version of This Manuscript Appeared in IEEE Communications Letters, vol. 16, Issue 3, Final Version pp. 300-303 DOI:10.1109/LCOMM.2012.011312.112067, Mar. 2012, 1-4.

* cited by examiner

RFID READER AND METHOD FOR RECOGNIZING RFID TAGS

CROSS-REFERENCE TO RELATED APPLICATIONS

This application claims priority from European Patent Application No. 16155476.1, which was filed on Feb. 12, 2016, and is incorporated herein in its entirety by reference.

The present invention relates to a Radio Frequency Identification reader, and to a method for recognizing Radio Frequency Identification tags.

BACKGROUND OF THE INVENTION

Radio Frequency Identification (RFID) is an automatic identification system that uses wireless communications to identify objects. Nowadays, large amounts of RFID tags are used in supply chains for product identification or sensor networks, especially, where the cost and energy are critical.

Recently the number of applications that use RFID technology have increased, and the reading speed became one of the most critical issues in these applications.

In RFID systems, the tags typically share a common communications channel. Thus, there is a certain probability of tag-collisions, i.e. multiple tags answering simultaneously. This collision probability naturally increases in dense networks with many tags. Since passive tags are the most practical tags in the market, because of their low price and simple design, they cannot sense the channel or communicate with the other tags. As a result, the reader is responsible for coordinating the network and has to avoid tag collisions using specific anti-collision algorithms.

The conventional anti-collision algorithm is the Framed Slotted ALOHA (FSA) algorithm [1], which is only a Medium Access Control (MAC) layer protocol. In such systems, only the answer of a single tag is considered as a successful slot, and if multiple tags respond simultaneously, a collision occurs. Then all the replied tags of this slot are discarded.

The performance of FSA-based protocols is maximized by adapting the frame length L to the number of RFID tags n. The frame length or frame size L specifies the number of slots associated with the amount of time or frame the RFID reader is waiting for responses of the RFID tags after submitting the request signal to the RFID tags.

However, in practical applications, the number of tags n in the interrogation region is unknown.

Furthermore, the number of tags n may even vary, e. g., when the tags are mounted on moving goods.

Therefore, so called Dynamic Framed Slotted ALOHA (DFSA) [2] is commonly used.

DFSA first estimates the number of tags in the interrogation area, and then calculates the optimal frame size L for the next reading cycle. Therefore, the system performance is controlled by how precise and fast the number of tags in the interrogation area is estimated.

Simple estimation methods have been proposed by Vogt [2] and Schoute [3].

The lower bound estimation method proposed by Vogt [2] states that the remaining number of tags is double the number of collided slots in the previous frame.

Schoute [3] proposed a posteriori expected factor of 2.39 to estimate the number of tags in the interrogation area.

However, both methods depend only on a single information which is the number of collided slots. Therefore, they increase the tags estimation error in dense networks [4].

The author of [1] proposed a more complex estimation method minimizing the distance between the observed empty $E_{obs}$, successful $S_{obs}$, and collided $C_{obs}$ slots and the expected values E, S, C for a given frame length L.

This is to be done via the following formula:

$$\varepsilon_{conv}(L, S_{obs}, C_{obs}, E_{obs}) = \min_{n}\{|E - E_{obs}| + |S - S_{obs}| + |C - C_{obs}|\}$$

However, this method involves numerical searching to find the optimum value of n.

Moreover, it is assumed that the responses of the tags are identically distributed in the slots, which is generally not an accurate assumption.

Another approach is given by [5]. It is assumed that tags in the frame are distributed using the binomial model. Once the values of the empty (E), successful (S), and collided slots (C) are obtained for a given number of time slots L, a posteriori distribution is calculated. Afterwards, the number of tags n is searched which maximizes the given a posteriori probability.

An improved version including the mutual dependence of different slot types (empty, successful, and collided) is presented in [6]. However, this method is more complex and needs more iterations to find the optimum value of n. Moreover, it does not improve the performance of the FSA compared to the proposal in [5].

In [4] the same approach as in [5] is used but based on the Poisson model instead of the binomial model. This is done in order to obtain a less complex equation and to decrease the searching complexity. However, it still needs iterations of searching to obtain the optimum value of n.

Proposals including a closed form solution for estimating the number of tags n without need for searching iterations are given by [7, 8]. However, both methods used numerical interpolations to reach to the optimum value of n. Therefore, both result equations cannot be used utilizing further parameters like the collision recovery probability which will be discussed later.

A different aspect worth to be considered is the following.

Modern RFID systems have the capability to convert some collided slots into successful slots. In such systems, the number of collided and successful slots delivered to the MAC layer are not accurate information about the real number of tags at the reading area. Therefore, the collision recovery probability α should be taken into consideration.

In [9], for an estimation approach of [1], the collision recovery probability α was taken into consideration. However, this method leads to a multi-dimensional searching, which is time consuming and has a high complexity. And there still remains the accuracy problem underlying the method according to [1].

SUMMARY

According to an embodiment, a device may have: a Radio Frequency Identification (RFID) reader, including a transmitter configured for transmitting a request signal, a receiver configured for receiving signals from Radio Frequency Identification (RFID) tags and an evaluator, wherein the receiver is configured to receive the signals from the RFID tags within a given number of slots of a time frame with a given frame size, wherein the receiver is configured to provide a number of successful slots in which one signal has been received and a number of collided slots in which a detection of one single signal was not possible, wherein the evaluator is configured to set a modified frame size based on an estimated number of RFID tags, wherein the evaluator is configured to determine the estimated number of RFID tags based on the frame size, the number of successful slots, and the number of collided slots.

According to another embodiment, a method for recognizing at least one Radio Frequency Identification (RFID) tag, may have the steps of: transmitting a request signal, receiving signals within a given number of slots of a time frame with a given frame size, providing a number of successful slots in which one signal has been received and a number of collided slots in which a detection of one single signal was not possible, determining an estimated number of RFID tags based on the frame size, the number of successful slots, the number of collided slots, and a collision recovery probability, and setting a modified frame size based on an estimated number of RFID tags.

A Radio Frequency Identification (RFID) reader comprises a transmitter configured for transmitting a request signal, a receiver configured for receiving signals from Radio Frequency Identification (RFID) tags and an evaluator. The receiver is configured to receive the signals from the RFID tags within a given number of slots of a time frame with a given frame size L. The receiver is configured to provide a number of empty slots (es) in which no signal has been received, a number of successful slots (ss) in which one signal has been received and a number of collided slots (cs) in which a detection of one single signal was not possible, i.e., in which a collision of the responses of different RFID tags occurred. The evaluator is configured to set a modified frame size (L') based on an estimated number of RFID tags ($n_{est}$). Further, the evaluator is configured to determine the estimated number of RFID tags ($n_{est}$) based on the frame size (L), the number of successful slots (ss), and the number of collided slots (cs).

The RFID reader in one embodiment, especially, is using the Dynamic Framed Slotted ALOHA.

In an embodiment the evaluator is configured to determine the estimated number of RFID tags ($n_{est}$) using a closed form solution.

In one embodiment $n_{est}$ is the estimated number of RFID tags, L' is the modified frame size, and the evaluator is configured to set the modified frame size L' via L'=$n_{est}$+/−5%.

In a different embodiment, the evaluator sets the modified frame size by a given function of the estimated number of RFID tags.

According to an embodiment of the RFID reader, $n_{est}$ is the estimated number of RFID tags, L is the frame size (which was used for the initial or foregoing measurement and which is going to be modified), cs is the number of collided slots, and ss is the number of successful slots. In this embodiment, the evaluator is configured to determine the estimated number of RFID tags ($n_{est}$) using the following formula:

$$n_{est} = \left( -\frac{b}{4a} - S + 0.5\sqrt{-4S^2 - 2P + \frac{q}{S}} \right) \cdot L,$$

with:

$a = 1/120^*(L-cs)$, $b = 1/24^*(L-cs-ss/5)$, $c = 1/6^*(L-cs-ss/4)$, $d = 1/2^*(L-cs-ss/3)$, $e = (L-cs-ss/2)$, $P = \dfrac{8ac - 3b^2}{8a^2}$, $q = \dfrac{b^3 - 4abc + 8a^2 d}{8a^3}$, $s = 0.5\sqrt{-\dfrac{2}{3}P + \dfrac{1}{3a}\left(Q + \dfrac{\Delta_0}{Q}\right)}$, $Q = \sqrt[3]{\dfrac{\Delta_1 + \sqrt{\Delta_1^2 - 4\Delta_0^3}}{2}}$, $\Delta_0 = c^2 - 3bd + 12ae$, and $\Delta_1 = 2c^3 - 9bcd + 27ad^2 - 72ace$.

According to a different embodiment, the receiver is configured to perform with a collision recovery probability α a collision recovery by identifying a signal within a slot having more than one signal. The receiver in this embodiment is configured to provide the number of successful slots ss and the number of collided slots cs after performing the collision recovery. Further, the evaluator is configured to determine the estimated number of RFID tags $n_{est}$ based on the frame size L, the number of successful slots ss, the number of collided slots cs, and the collision recovery probability α. In this embodiment, in the collided slots more than one response of the RFID tags occurred and it was not possible for the receiver to resolve the collisions and to identify a single signal.

In a following embodiment, the collision recovery affects the formula for calculating the estimated number of tags.

In this embodiment, $n_{est}$ is the estimated number of RFID tags, L is the frame size (used in order to obtain the following numbers of slots), cs is the number of collided slots, ss is the number of successful slots, and a is the collision recovery probability (being dependent on the kind of collision recovery used by the receiver and dependent on the situation, e.g., on the signal to noise ratio of the received signals).

Using this values, the evaluator is configured to determine the estimated number of RFID tags $n_{est}$ using the following formula:

$$n_{est} = \left( -\frac{b}{4a} - S + 0.5\sqrt{-4S^2 - 2P + \frac{q}{S}} \right) \cdot L,$$

with:

$a = 1/120^*(L-C_b)$, $b = 1/24^*(L-C_b-S_b/5)$, $c = 1/6^*(L-C_b-S_b/4)$, $d = 1/2^*(L-C_b-S_b/3)$, $e = (L-C_b-S_b/2)$, $P = \dfrac{8ac - 3b^2}{8a^2}$, $q = \dfrac{b^3 - 4abc + 8a^2 d}{8a^3}$, $s = 0.5\sqrt{-\dfrac{2}{3}P + \dfrac{1}{3a}\left(Q + \dfrac{\Delta_0}{Q}\right)}$, -continued $$Q = \sqrt[3]{\frac{\Delta_1 + \sqrt{\Delta_1^2 - 4\Delta_0^3}}{2}},$$

$\Delta_0 = c^2 - 3bd + 12ae$, and $\Delta_1 = 2c^3 - 9bcd + 27ad^2 - 72ace$.

In these equations:

$C_b$ is the number of collided slots before the collision recovery performed by the receiver and $C_b$ is associated with the number of collided slots cs—i.e. with the output of the receiver after the collision recovery—by the collision recovery probability $\alpha$ via: $C_b = cs/(1-\alpha)$.

$S_b$ is the number of successful slots before the collision recovery performed by the receiver and $S_b$ is associated with the number of successful slots ss by the collision recovery probability $\alpha$ via: $S_b = ss - \alpha/(1-\alpha)*C$. This is based on the fact that the number of successful slots is increased by the signals recovered from the original collided slots.

The calculation of the estimated number of RFID tags $n_{est}$ is in one embodiment done by inserting the values into respective equations and is done in a different or additional embodiment by using tables or stored values or pairs of values.

The method for recognizing at least one Radio Frequency (RFID) tag comprises at least the following steps:
transmitting a request signal,
receiving signals within a given number of slots of a time frame with a given frame size (L),
providing a number of successful slots (ss) in which one signal has been received and a number of collided slots (cs) in which a detection of one single signal was not possible due to a collision of the signals of RFID tags within the respective slot,
determining an estimated number of RFID tags ($n_{est}$) based on the frame size (L), the number of successful slots (ss), the number of collided slots (cs), and a collision recovery probability ($\alpha$), and
setting a modified frame size (L') based on an estimated number of RFID tags ($n_{est}$).

The above discussed embodiments and features of the RFID reader can also be realized via the method and vice versa.

The collision recovery probability $\alpha$ is the probability to recover the response signal stemming from one RFID tag after this signal and at least one other signal stemming from a different RFID tag were transmitted in the same time slot leading to a collision within the slot. Hence, the collided slots are slots in which a collision occurred but for which it was not possible to detect a single signal. Accordingly, successful slots are either slots with just one signal or slots with a successful collision recovery.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
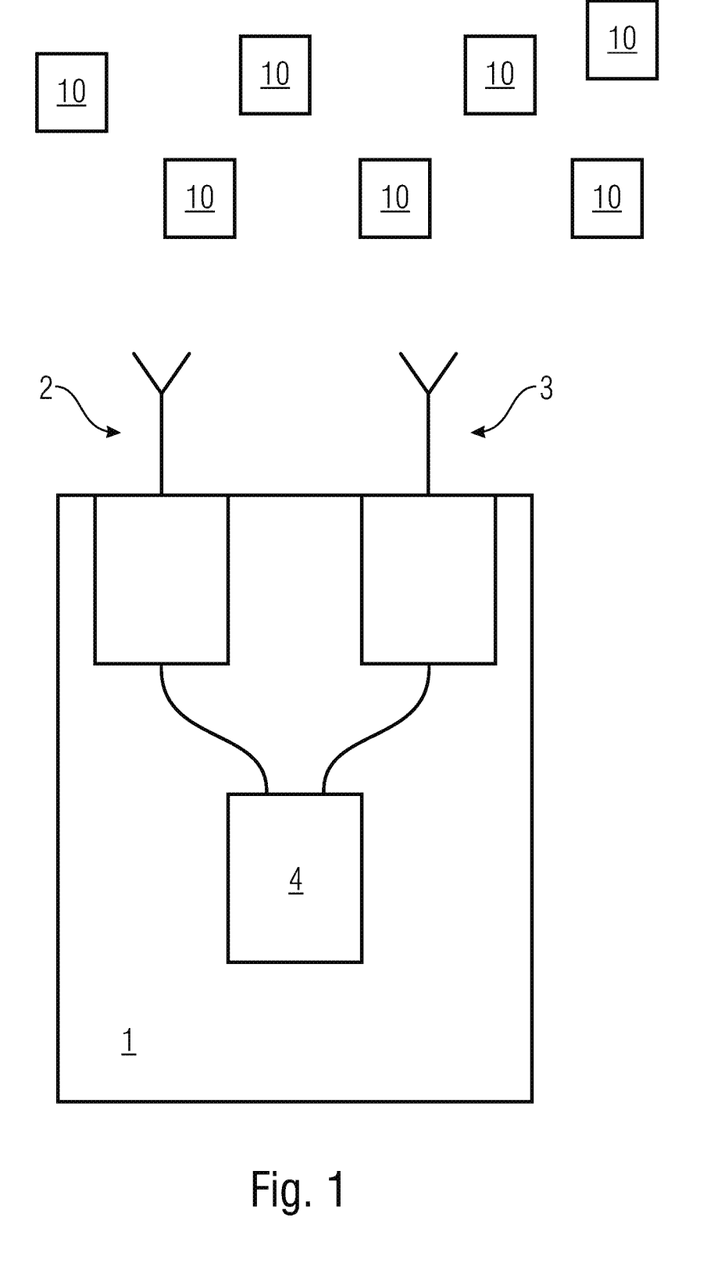
FIG. 1 shows schematically an inventive RFID reader.

FIG. 1 shows schematically an inventive RFID reader 1 in the vicinity of different RFID tags 10. The RFID reader 1 sends via its transmitter 2 a request signal to the RFID tags 10 asking for a response including an identification from the RFID tags 10. This request signal is followed by a certain amount of time or a time frame of size L in which the receiver 3 is listening for response signals from the RFID tags 10.

This time frame is divided in a given number of slots with the intention that each RFID tags 10 answers during a different slot. For this random distribution of the answers, usually, a 16-Bit random number (RN16) is used.

In case more than one RFID tag answers in the same slot, the slot is discarded as usually just one RFID tag can be identified within a slot.

The shown RFID reader 1 is able to perform a collision recovery, i.e. to extract one signal from a slot having more than one response signal. Such an identification is, e.g., possible when the concerned RFID tags have different distances from the RFID reader leading to discernibly different signal amplitudes. This collision recovery happens on the physical layer of the receiver 3.

After listening for answers during the time frame, the receiver 3 provides the number of the successful slots (ss or S in a part of the following explanation), the number of collided and, thus, discarded slots (cs or C in the following), and the number of the empty slots (es or E in the following). The sum of the numbers of the slots equals the number of slots of the frame L. Hence, in one embodiment, just the numbers of two kind of slots (e.g. collided and successful slots) are provided by the receiver.

Based on the number of collided and successful slots, the current frame size L, and the collision recovery probability $\alpha$, the evaluator 4 determines an estimated value of the number of RFID tags 10 present in the vicinity of the RFID reader 1: $n_{est}$. With this value $n_{est}$ the modified frame size L' for the next turn of listening to the responses of the RFID tags is determined, i.e., accordingly adjusted.

In the invention for adapting the frame size L to the given situation and the number of present RFID tags, the number of RFID tags is estimated using a closed form solution and taking the collision recovery probability $\alpha$ of the system into consideration.

As one aspect of the invention, the collision recovery probability $\alpha$ is calculated from the physical layer parameters.

The invention gives a direct relation between the estimated number of tags n and the frame length L, successful and collided number of slots S (or ss), C (or cs), and the collision recovery probability $\alpha$. This closed form eases the calculation of the estimated number of slots $n_{est}$, thus, reducing the energy consumption for the calculations and the requirements on the calculation facilities of the RFID reader. Further, in contrast to an iterative calculation of the frame size, it is possible to obtain an optimal value even after one initial measurement.

The invention is based on the classical Maximum Likelihood (ML) estimation as given by [5].

According to the classical ML estimation method, the optimum value of the estimated number of RFID tags: $n_{est}$ is searched which maximizes the conditional probability of the observing vector v=(C, S, E) with the number of collided, successful and empty slots, respectively. This is done under the assumption that n tags transmit at a frame length L.

This conditional probability is given by:

$$P(n/L, S, C, E) = \frac{L!}{E!S!C!} P_e^E P_s^S P_c^C \tag{1}$$

C, S, and E are successively the number of collided, successful, and empty slots for a given frame length L. $P_e$, $P_s$, and $P_c$ are respectively the probabilities of empty, successful and collided transmission per slot.

As modern RFID readers have a collision recovery capability, the physical layer allows to convert a part of collided slots into successful slots. This is described by the following relations:

$E=E_b$, $S=S_b+\alpha*C_b$, and $C=C_b-\alpha*C_b=C_b(1-\alpha) \tag{2}$ $E_b$, $S_b$, and $C_b$ are successively the number of empty, successful, and collided slots before a collision recovery of the RFID system. C, S, E are respectively the number of collided, successful, and empty slots after the collision recovery of the system. Finally, $\alpha$ is the collision recovery probability.

In the MAC layer, only the values of C, S, E after collision recovery are known, and there is no information about these values ($E_b$, $S_b$, and $C_b$) before collision recovery.

Thus, the conventional estimation systems including the classical ML number of tags estimation in formula (1) use the values of C, S, E after collision recovery in their calculations.

However, these values are not accurate indicators about the actual number of tags in the reading area.

In the inventive system, the value of the current average collision recovery probability $\alpha$ as shown in [10] is estimated.

Afterwards, the corresponding values of $E_b$, $S_b$, and $C_b$ are calculated, using the formulas (2):

$E_b=E$, $S_b=S-\alpha/(1-\alpha)*C$, and $C_b=C/(1-\alpha). \tag{3}$

This is done under the condition that the respective numbers of slots before collision recovery are connected to the frame length L via:

$L=E_b+S_b+C_b. \tag{4}$

This implies that the maximum number of collided slots before collision recovery $C_{b(max)}$ is given by:

$C_{b(max)}=L-E_b$ and that the minimum number of successful slots before collision recovery $S_{b(min)}$ is given by:

$S_{b(min)}=0$.

Therefore, the proposed collision recovery aware ML conditional probability can be formalized as:

$$P(n/L, S, C, E, \alpha) = \frac{L!}{E_b!S_b!C_b!} P_e^{E_b} P_s^{S_b} P_c^{C_b} \tag{5}$$

Considering a dense RFID network, the approximation suggested in [4] for probability of transmission of the RFID tags per slot is used, which are considered as independent Poisson random variables with unknown mean $\gamma=n_{est}/L$ with the estimated number of tags $n_{est}$ and the frame length L.

The respective probabilities are given by:

$$P_e=e^{-\gamma}, P_s=\gamma \cdot e^{-\gamma}, P_c=1-e^{-\gamma}-\gamma \cdot e^{-\gamma}. \tag{6}$$

Substituting the probabilities in formula (5) by the probabilities of (6) and normalizing the result equation from the constant $$\frac{L!}{E_b!S_b!C_b!},$$

the resulting proposed conditional probability will be:

$$P(n/L,S,C,E,\alpha)=\gamma^{S_b} \cdot e^{-\gamma \cdot L} \cdot (e^{-\gamma}-1-\gamma)^{C_b} \tag{7}$$

The computation of formula (7) could be done numerically to obtain the optimum value of $n_{est}$ which maximizes formula (7). Nevertheless, the calculation of formula (7) may lead to numerical instability problems using low-complexity devices.

Therefore, in the method according to the invention, a closed form solution for the collision recovery aware estimation is used.

This is achieved by differentiating formula (7) with respect to $\gamma=n_{est}/L$ and by equating the results to zero, i.e., by calculation an extremum of the formula (7).

After differentiating, the equation can be simplified as:

$$e^{-\gamma}\left(1 + \frac{\gamma(\gamma \cdot L - S_b)}{(\gamma \cdot L - S_b - \gamma \cdot C_b)}\right) - 1 = 0. \tag{8}$$

The analysis of formula (8) indicates that the relevant values for $\gamma$ are in the region close to one (compare [10]).

Hence, a Taylor series for $e^{-\gamma}$ can be developed, which leads to:

$$e^{-\gamma} \simeq 1 - \gamma + \frac{1}{2}\gamma^2 - \frac{1}{6}\gamma^3. \tag{9}$$

After substituting formula (8) and some additional simplifications, the final equation is a fourth order polynomial:

$$\underbrace{\frac{1}{120}(L-C_b)}_{(a)}\gamma^4 + \underbrace{\frac{1}{24}\left(L-C_b-\frac{S_b}{5}\right)}_{(b)}\gamma^3 + \tag{10}$$

$$\underbrace{\frac{1}{6}\left(L-C_b-\frac{S_b}{4}\right)}_{(c)}\gamma^2 + \underbrace{\frac{1}{2}\left(L-C_b-\frac{S_b}{3}\right)}_{(d)}\gamma - \underbrace{\left(C_b+\frac{S_b}{2}\right)}_{(e)} = 0$$

The abbreviations are given under the respective terms and are:

$a=1/120*(L-C_b)$, $b=1/24*(L-C_b-S_b/5)$, $c = 1/6 * (L - C_b - S_b/4)$, $d = 1/2 * (L - C_b - S_b/3)$, $e = (L - C_b - S_b/2)$.

So that:

$a*\gamma^4 + b*\gamma^3 + c*\gamma^2 + d*\gamma - e = 0$

Equation (10) has four roots given by:

$$\gamma_{1,2} = -\frac{b}{4a} - S \pm 0.5 \sqrt{\underbrace{-4S^2 - 2P + \frac{q}{S}}_{X}} \quad (11)$$

$$\gamma_{3,4} = -\frac{b}{4a} + S \pm 0.5 \sqrt{\underbrace{-4S^2 - 2P - \frac{q}{S}}_{Y}},$$

using the following substitutions:

$$P = \frac{8ac - 3b^2}{8a^2},$$

$$q = \frac{b^3 - 4abc + 8a^2 d}{8a^3},$$

$$S = 0.5 \sqrt{-\frac{2}{3}P + \frac{1}{3a}\left(Q + \frac{\Delta_0}{Q}\right)}$$

(this substitution S is not to be confused with the number S of successful slots), $$Q = \sqrt[3]{\frac{\Delta_1 + \sqrt{\Delta_1^2 - 4\Delta_0^3}}{2}},$$

$\Delta_0 = c^2 - 3bd + 12ae$, and $\Delta_1 = 2c^3 - 9bcd + 27ad^2 - 72ace$.

Using Descartes' rules of sign – which states that if the terms of a single-variable polynomial with real coefficients are ordered by descending variable exponent, then the number of positive roots of the polynomial is either equal to the number of sign differences between consecutive nonzero coefficients or is less than it by an even number—the proposed closed form solution for the collision recovery aware tag estimation is:

$$n_{est} = \left(-\frac{b}{4a} - S + 0.5 \sqrt{-4S^2 - 2P + \frac{q}{S}}\right) \cdot L \quad (12)$$

This equations allows to estimate the number of RFID tags present in the surrounding of an RFID reader and allows to set the frame size L for a following turn of submitting a request signal and waiting for replies of the present RFID tags.

For the determination of the estimated number of RFID tags $n_{est}$, the frame size of a first reading of the replies of the RFID tags to a request signal L, the number of the collided slots before collision recovery $C_b$, and the number of the successful slots before collision recovery $S_b$ may be used.

The number of the collided slots before collision recovery $C_b$ and the number of the successful slots before collision recovery $S_b$ are determined using equations (10) based on the collision recovery probability α.

Hence, one measurement is done leading to the number of collided slots C (or cs) and the number of the successful slots S (or ss). With these results, the used frame size L, and the collision recovery probability α, formula (12) allows to determine the estimated number of RFID tags $n_{est}$ in the surrounding of the RFID reader. This estimated number $n_{est}$ allows to adjust the frame size L for the next measurement.

Hence, it may be used to obtain the collision recovery probability α.

In the following, an embodiment will be given for determining the collision recovery probability α which varies in the range of $0 \leq \alpha \leq 1$ and which depends on the method used by the RFID reader for recovering tag signals from a collided slot.

The value of the collision recovery probability α depends on the Signal to Noise Ratio (SNR) of the received signals.

In the following embodiment, the SNR for each slot will be measured allowing the calculation of the average SNR per frame.

In [11], for a collision recovery it was proposed to capture the strongest tag reply based the physical layer properties leading to a Bit Error Rate (BER) curve versus the SNR.

In the following embodiment, the capture probability for a complete collided RN16 packet is calculated, which includes 16 random successive bits. The BER is mapped to Packet Error Rate (PER) by simulation as the channel is not Binary Symmetric Channel (BSC). The packet error ratio in the field of digital transmission is the number of incorrectly received data packets divided by the total number of received packets. A packet is declared incorrect if at least one bit is erroneous.

The capture probability can be expressed as: α=(1−PER).

Figure 2:
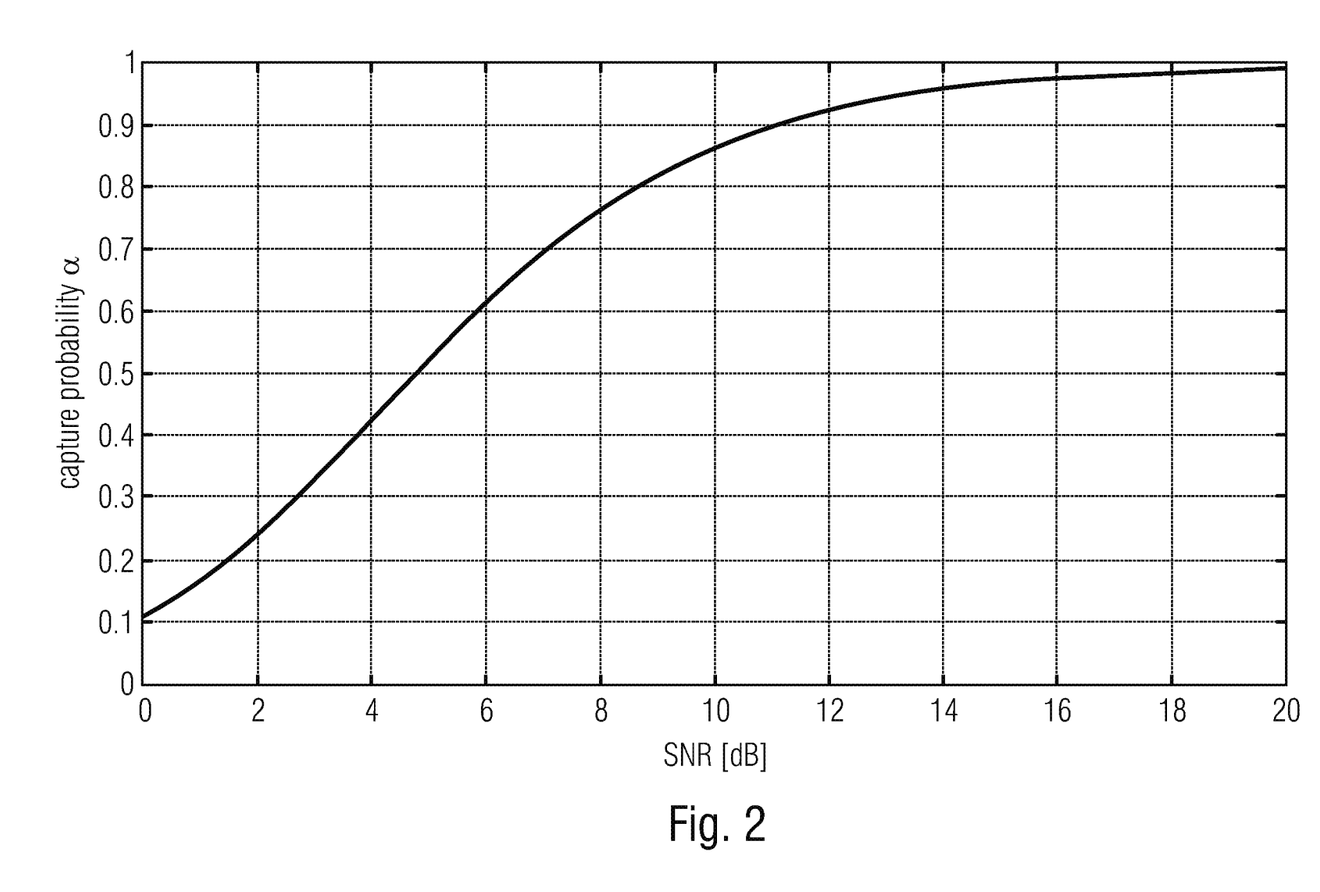
FIG. 2 shows the capture probability versus the signal to noise ratio for an exemplary RFID reader.

FIG. 2 presents the values of the capture probabilities versus the average signal to noise ratio per frame. This is done for one example of an RFID reader (a different expression is RFID receiver). It has to be kept in mind that the collision recovery probability α first of all depends on the abilities of the used RFID reader and its collision recovery capability. In the following example, the average capture probability is calculated from the corresponding average SNR at the current frame.

It follows an evaluation of the performance of the invention.

At first, a performance metric called relative estimation error ε will be defined as follows:

$$\epsilon = \left|\frac{n_{est} - n}{n}\right| \times 100\% \quad (13)$$

Figure 3A:
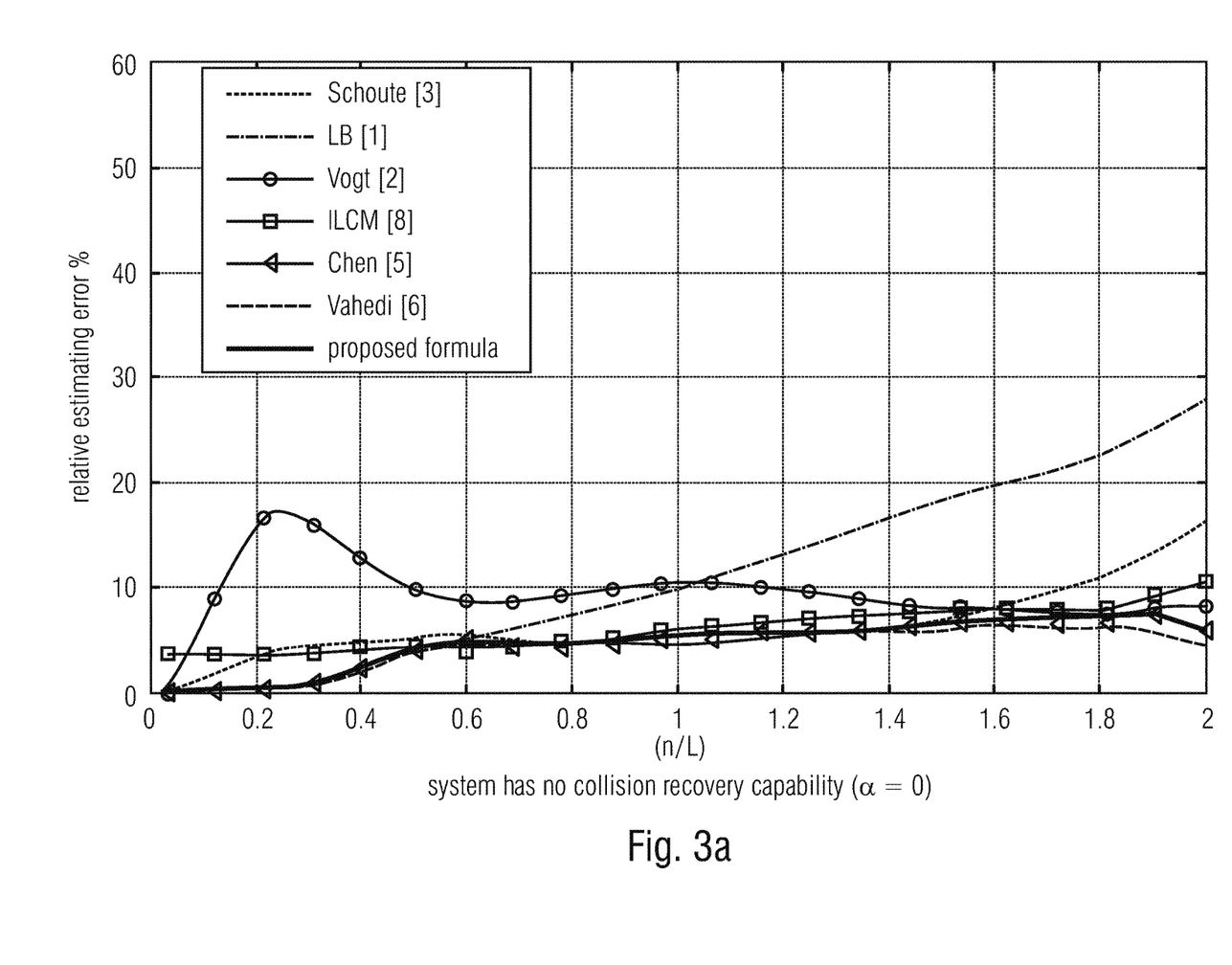
FIG. 3a-b shows the relative estimation error versus the normalized number of tags n/L for systems without (FIG. 3a) and with collision recovery capability (FIG. 3b)
Figure 3B:
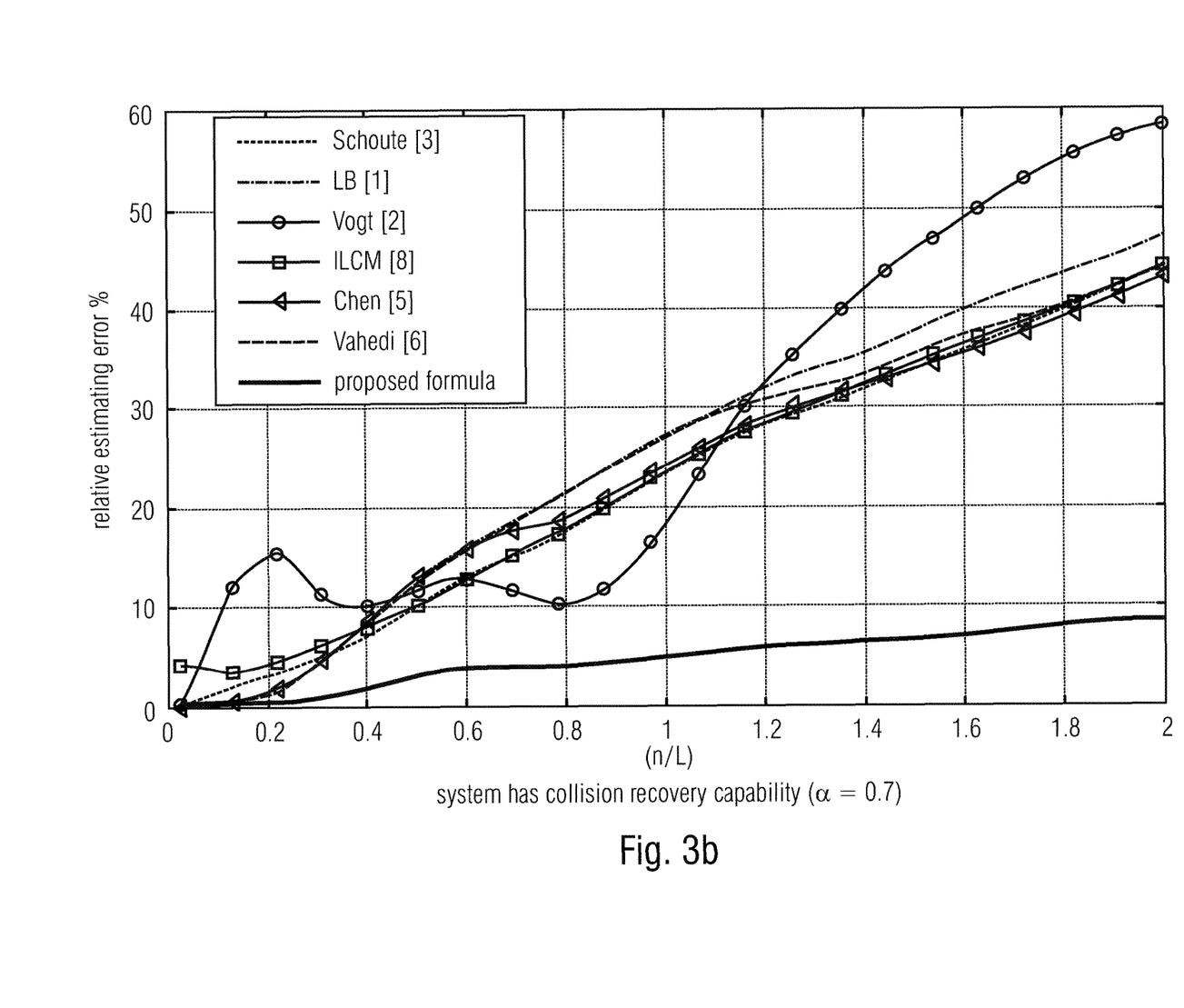

FIG. 3 shows the percentage of the relative estimation error for the proposed system compared to the literature versus the normalized number of tags n/L.

FIG. 3a shows a system lacking collision recovery capability (α=0). Obviously, the proposed invention gives identical relative estimation error compared to [5].

However, the proposed system gives a closed form solution but the solution of [5] is based on numerical searching. The method according to [6] which included the mutual independence of slot types has almost the same results compared to the proposed results. However, it includes a very complex searching algorithms compared to the proposed closed form solution.

FIG. 3b shows an example for modern systems having collision recovery capability.

For the figure, a collision recovery probability α=0.7 was used.

FIG. 3b shows that the curve of the inventive method has a more accurate estimation performance compared to all the literature.

Figure 4:
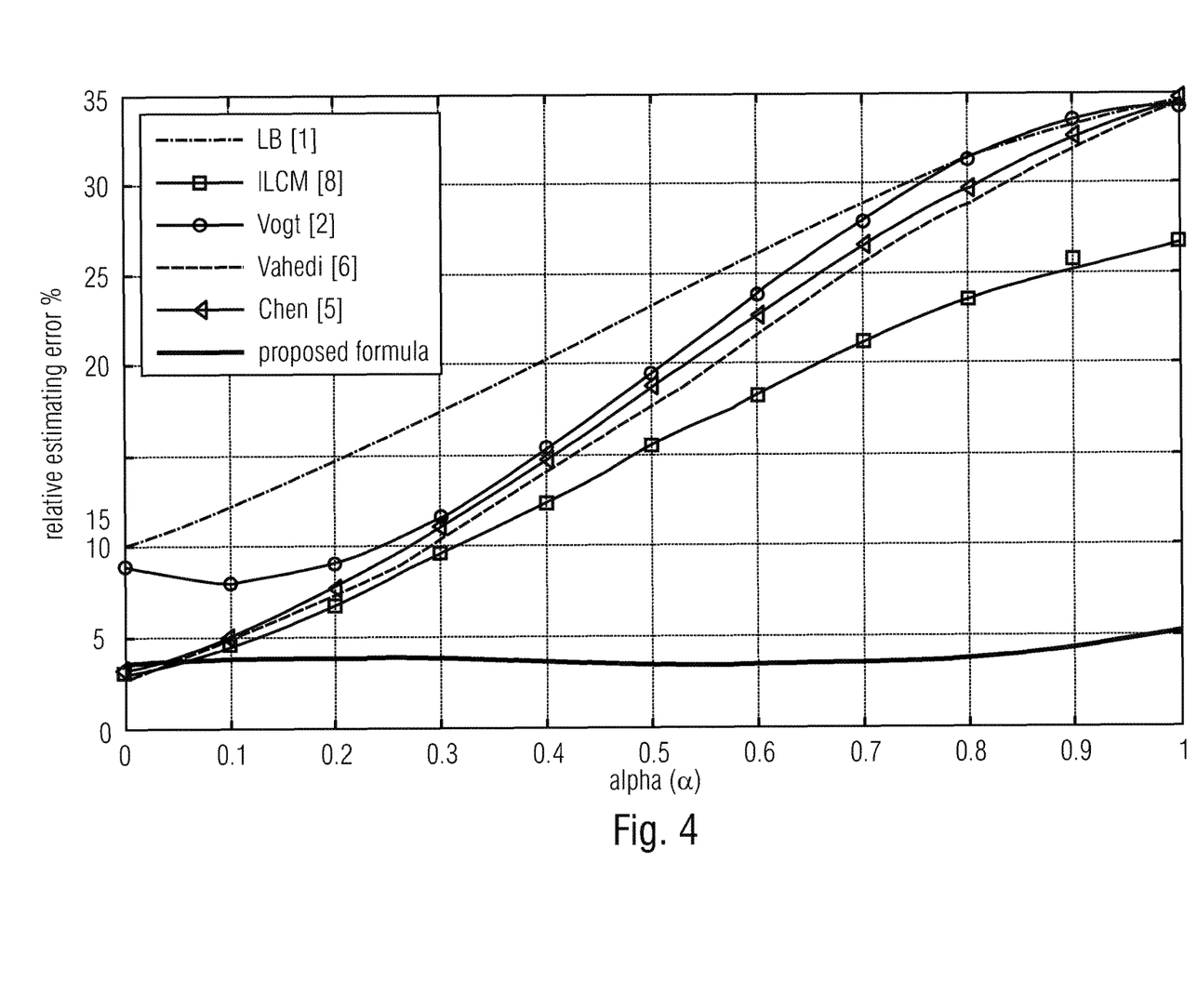
FIG. 4 shows the relative estimation error versus the collision recovery probability, where the number of slots L equals the number of tags n.

FIG. 4 shows the relative estimation error versus the collision recovery probability α assuming that the number of tags in the reading area is equal to the frame length, i.e., where n=L holds.

It shows that when the value of the collision recovery probability increases, the performance of all other proposals decreases, except the proposed method has almost constant performance independent on the value of the collision recovery probability.

Figure 5A:
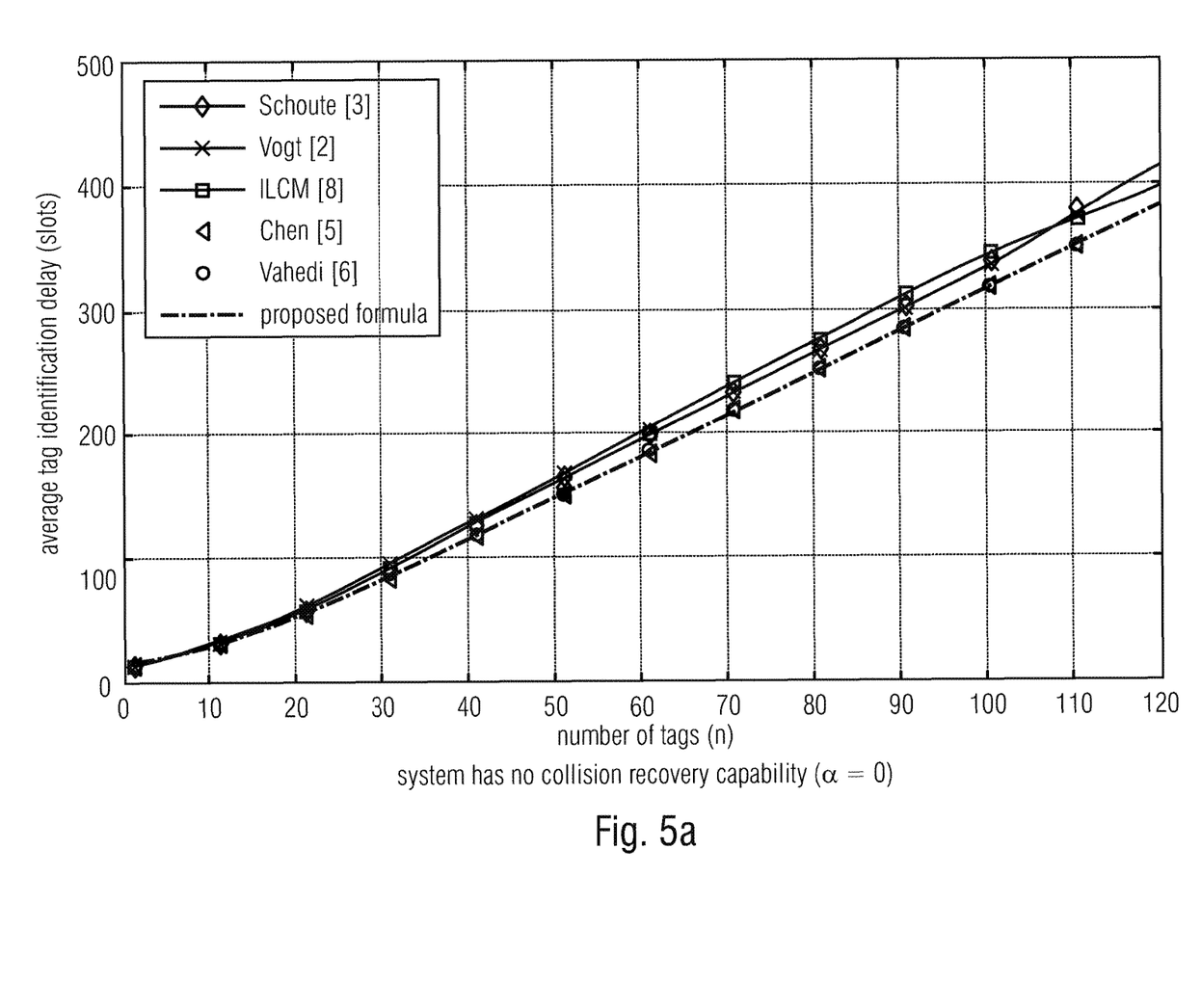
FIG. 5a-b shows the average identification delay for systems without (FIG. 5a) and with collision recovery capability (FIG. 5b).
Figure 5B:
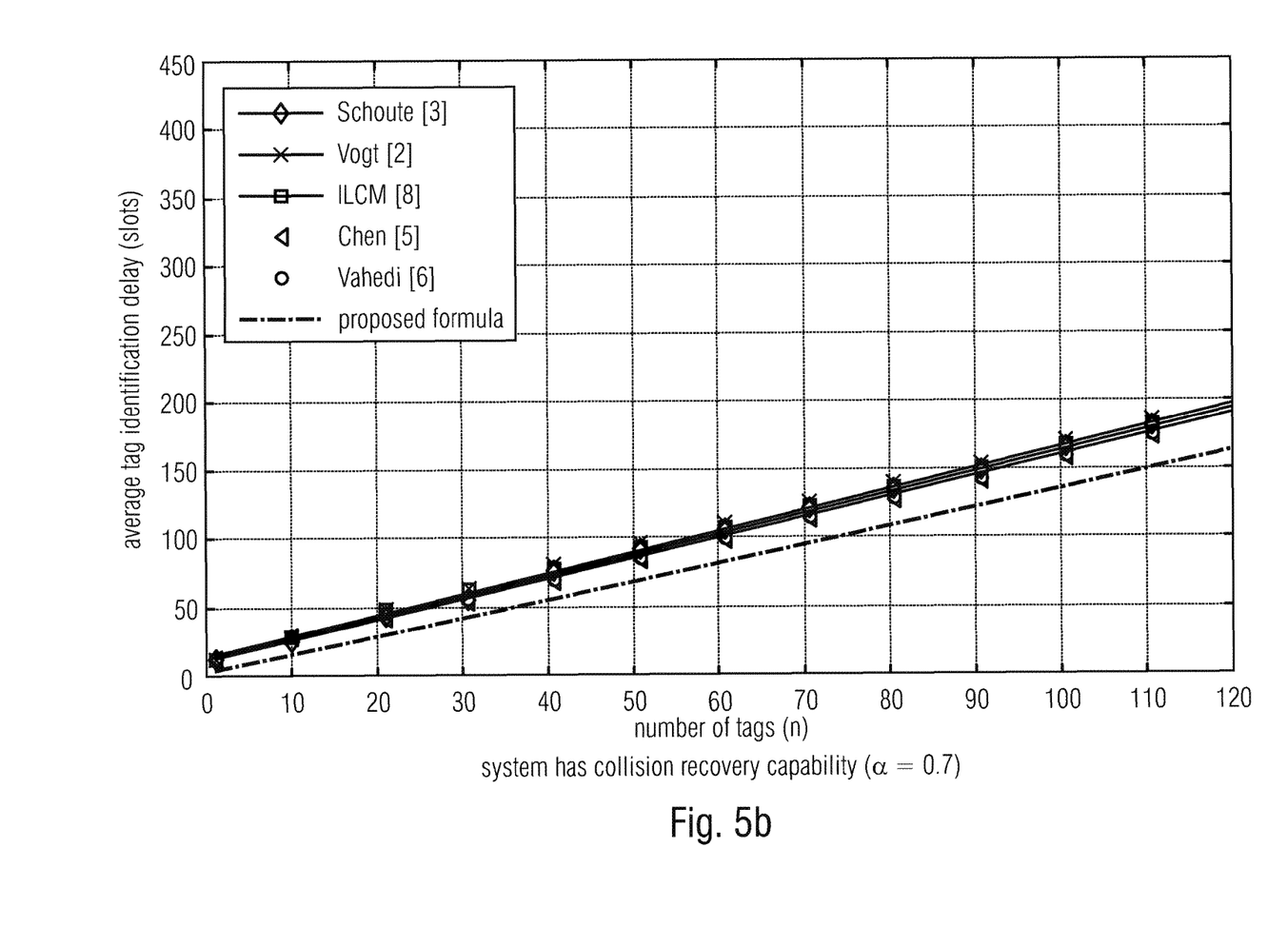

FIG. 5 shows the average identification delay for a bunch of tags.

FIG. 5a shows the identification time for systems with no collision recovery capability (α=0). In these simulations is was assumed that the optimum frame length is the nearest quantized $2^Q$ for L=n. The proposed method gives identical results compared to [5] and [6] better than the other literature.

FIG. 5b, shows the average identification delay for systems has a collision recovery probability α=0.7.

The average identification delay has decreased for all the systems due to the collision recovery capability. However, the proposed system saves the total identification time with almost 10% compared to the others due to the performance of estimation only.

The invention comprises the following features:
The proposed estimation method considers the collision recovery probability of the system. Here, the collision recovery probability depends on the type of receiver and the current value of the SNR.
The estimation accuracy of the proposed estimation method is not affected by the value of the collision recovery probability of the RFID reader (value of α).
The proposed method proposes a closed form solution.
The usage of the closed form solution provides at least the following advantages:
There is no need for any look up table.
No numerical instability problems arise using low-complexity devices even in dense RFID networks.
The invention is useful for all RFID applications which:
follow EPCglobal class 1 gen 2 standards.
are affected by a dense number of tags.
suffer from the fact that time is a very critical issue in the identification process.

Although some aspects have been described in the context of an apparatus, it is clear that these aspects also represent a description of the corresponding method. Analogously, aspects described in the context of a method step also represent a description of a corresponding block or item or feature of a corresponding apparatus.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] H. Vogt, "Efficient object identification with passive RFID rags", International Conference on Pervasive Computing, Zürich, 2002.

[2] H. Vogt, "Multiple object identification with passive rfid tags", Systems, Man and Cybernetics, 2002 IEEE International Conference on, vol. 3, pp. 6 pp. vol. 3, October 2002.
[3] F. Schoute, "Dynamic Frame Length ALOHA", IEEE Transactions on Communications, vol. 31, no. 4, pp. 565-568, 1983.
[4] A. Zanella, "Estimating collision set size in framed slotted aloha wireless networks and rfid systems", Communications Letters, IEEE, vol. 16, pp. 300-303, 2012.
[5] W.-T. Chen, "An accurate tag estimate method for improving the performance of an rfid anticollision algorithm based on dynamic frame length aloha", Automation Science and Engineering, IEEE Transactions on, vol. 6, pp. 9-15, 2009.
[6] E. Vahedi, V. Wong, I. Blake, and R. Ward, "Probabilistic analysis and correction of chen's tag estimate method", Automation Science and Engineering, IEEE Transactions on, vol. 8, pp. 659-663, 2011.
[7] P. Solic, J. Radic, and N. Rozic, "Linearized combinatorial model for optimal frame selection in gen2 rfid system", in RFID (RFID), 2012 IEEE International Conference on, pp. 89-94, 2012.
[8] P. Solic, J. Radic, and N. Rozic, "Energy efficient tag estimation method for alohabased rfid systems", Sensors Journal, IEEE, vol. 14, pp. 3637-3647, 2014.
[9] B. Li and J. Wang, "Efficient anti-collision algorithm utilizing the capture effect for iso 18000-6c rfid protocol", Communications Letters, IEEE, vol. 15, pp. 352-354, 2011.
[10] H. Salah, H. Ahmed, J. Robert, and A. Heuberger, "A time and capture probability aware closed form frame slotted aloha frame length optimization", Communications Letters, IEEE, vol. 19, pp. 2009-2012, 2015.
[11] C. Angerer, R. Langwieser, and M. Rupp, "Rfid reader receivers for physical layer collision recovery", Communications, IEEE Transactions on, vol. 58, pp. 3526-3537, 2010.

The invention claimed is:

1. A Radio Frequency Identification (RFID) reader,
comprising a transmitter configured for transmitting a request signal, a receiver configured for receiving signals from Radio Frequency Identification (RFID) tags and an evaluator,
wherein the receiver is configured to receive the signals from the RFID tags within a given number of slots of a time frame with a given frame size,
wherein the receiver is configured to provide a number of successful slots in which one signal has been received and a number of collided slots in which a detection of one single signal was not possible,
wherein the evaluator is configured to set a modified frame size based on an estimated number of RFID tags,
wherein the evaluator is configured to determine the estimated number of RFID tags based on the given frame size, the number of successful slots, and the number of collided slots,
wherein the receiver is configured to perform a collision recovery by identifying a signal within a slot comprising more than one signal,
wherein the receiver is configured to obtain a collision recovery probability α at which the collision recovery is performed by the receiver,
wherein the receiver is configured to provide, in the provision, the number of successful slots, ss, and the number of collided slots, cs, after performing the collision recovery, and
wherein the evaluator is configured to determine the estimated number of RFID tags based on the given frame size L, the number of successful slots ss, the number of collided slots cs, and the collision recovery probability α by calculating the number of collided slots before the collision recovery, Cb, and the number of successful slots before the collision recovery, Sb, according to $S_b = ss - \alpha/(1-\alpha)*C$, and $C_b = cs/(1-\alpha)$ and determining the estimated number of RFID tags based on the given frame size L, the number of the collided slots $C_b$, and the number of the successful slots $S_b$.

2. The RFID reader of claim 1,
wherein said evaluator is configured to determine the estimated number of RFID tags using a closed form solution.

3. The RFID reader of claim 1,
wherein $n_{est}$ is the estimated number of RFID tags,
wherein L' is the modified frame size, and
wherein the evaluator is configured to set the modified frame size L' via $L' = n_{est} +/- (n_{est} \cdot 5\%)$.

4. A Radio Frequency Identification (RFID) reader,
comprising a transmitter configured for transmitting a request signal, a receiver configured for receiving signals from Radio Frequency Identification (RFID) tags and an evaluator,
wherein the receiver is configured to receive the signals from the RFID tags within a given number of slots of a time frame with a given frame size,
wherein the receiver is configured to provide a number of successful slots in which one signal has been received and a number of collided slots in which a detection of one single signal was not possible,
wherein the evaluator is configured to set a modified frame size based on an estimated number of RFID tags,
wherein the evaluator is configured to determine the estimated number of RFID tags based on the given frame size, the number of successful slots, and the number of collided slots,
wherein $n_{est}$ is the estimated number of RFID tags,
wherein L is the given frame size,
wherein cs is the number of collided slots,
wherein ss is the number of successful slots,
wherein said evaluator is configured to determine the estimated number of RFID tags using the following formula:

$$n_{est} = \left(-\frac{b}{4a} - S + 0.5\sqrt{-4S^2 - 2P + \frac{q}{S}}\right) \cdot L,$$

with:

$a = 1/120^*(L - cs),$ $b = 1/24^*(L - cs - ss/5),$ $c = 1/6^*(L - cs - ss/4),$ $d = 1/2^*(L - cs - ss/3),$ $e = (L - cs - ss/2),$ $P = \frac{8ac - 3b^2}{8a^2},$ $q = \frac{b^3 - 4abc + 8a^2d}{8a^3},$ $s = 0.5\sqrt{-\frac{2}{3}P + \frac{1}{3a}\left(Q + \frac{\Delta_0}{Q}\right)},$ -continued $$Q = \sqrt[3]{\frac{\Delta_1 + \sqrt{\Delta_1^2 - 4\Delta_0^3}}{2}},$$

$\Delta_0 = c^2 - 3bd + 12ae$, and $\Delta_1 = 2c^3 - 9bcd + 27ad^2 - 72ace$.

5. A Radio Frequency Identification (RFID) reader, comprising a transmitter configured for transmitting a request signal, a receiver configured for receiving signals from Radio Frequency Identification (RFID) tags and an evaluator,
wherein the receiver is configured to receive the signals from the RFID tags within a given number of slots of a time frame with a given frame size,
wherein the receiver is configured to provide a number of successful slots in which one signal has been received and a number of collided slots in which a detection of one single signal was not possible,
wherein the evaluator is configured to set a modified frame size based on an estimated number of RFID tags,
wherein the evaluator is configured to determine the estimated number of RFID tags based on the given frame size, the number of successful slots, and the number of collided slots,
wherein $n_{est}$ is the estimated number of RFID tags,
wherein L is the given frame size,
wherein cs is the number of collided slots,
wherein ss is the number of successful slots,
wherein $\alpha$ is the collision recovery probability,
wherein the evaluator is configured to determine the estimated number of RFID tags using the following formula:

$$n_{est} = \left(-\frac{b}{4a} - S + 0.5\sqrt{-4S^2 - 2P + \frac{q}{S}}\right) \cdot L,$$

with:

$a = 1/120^*(L - C_b)$, $b = 1/24^*(L - C_b - S_b/5)$, $c = 1/6^*(L - C_b - S_b/4)$, $d = 1/2^*(L - C_b - S_b/3)$, $e = (L - C_b - S_b/2)$, $P = \dfrac{8ac - 3b^2}{8a^2}$, $q = \dfrac{b^3 - 4abc + 8a^2d}{8a^3}$, $s = 0.5\sqrt{-\dfrac{2}{3}P + \dfrac{1}{3a}\left(Q + \dfrac{\Delta_0}{Q}\right)}$, -continued $$Q = \sqrt[3]{\frac{\Delta_1 + \sqrt{\Delta_1^2 - 4\Delta_0^3}}{2}},$$

$\Delta_0 = c^2 - 3bd + 12ae$, and $\Delta_1 = 2c^3 - 9bcd + 27ad^2 - 72ace$, wherein $C_b$ is the number of collided slots before the collision recovery performed by the receiver,
wherein $C_b$ is associated with the number of collided slots cs by the collision recovery probability $\alpha$ via: $C_b = cs/(1-\alpha)$,
wherein $S_b$ is the number of successful slots before the collision recovery performed by the receiver,
wherein $S_b$ is associated with the number of successful slots ss by the collision recovery probability $\alpha$ via: $S_b = ss - \alpha/(1-\alpha)^*C$.

6. A method for recognizing at least one Radio Frequency Identification (RFID) tag, comprising:
transmitting a request signal,
receiving signals within a given number of slots of a time frame with a given frame size,
providing a number of successful slots in which one signal has been received and a number of collided slots in which a detection of one single signal was not possible,
determining an estimated number of RFID tags based on the frame size, the number of successful slots, the number of collided slots, and a collision recovery probability, and
setting a modified frame size based on an estimated number of RFID tags,
wherein the method further comprises
performing a collision recovery by identifying a signal within a slot having more than one signal, and
obtaining a collision recovery probability $\alpha$ at which the collision recovery is performed,
wherein the provision provides the number of successful slots, ss, and the number of collided slots, cs, after performing the collision recovery, and
wherein the estimated number of RFID tags is determined based on the frame size L, the number of successful slots ss, the number of collided slots cs, and the collision recovery probability $\alpha$ by calculating the number of collided slots before the collision recovery, Cb, and the number of successful slots before the collision recovery, Sb, according to $S_{b=ss-\alpha/}(1-\alpha)^*C$, and $C_b = cs/(1-\alpha)$ and determining the estimated number of RFID tags based on the frame size, the number of the collided slots $C_b$, and the number of the successful slots $S_b$.

* * * * *

UNITED STATES PATENT AND TRADEMARK OFFICE
CERTIFICATE OF CORRECTION

PATENT NO. : 10,095,892 B2
APPLICATION NO. : 15/430130
DATED : October 9, 2018
INVENTOR(S) : Hazem Elsaid Ibrahim et al.

It is certified that error appears in the above-identified patent and that said Letters Patent is hereby corrected as shown below:

On the Title Page

Item (71) Applicant:
Please change "Friedrich-Alexander-Universitaet Erlangen-Nuemberg, Erlangen (DE)" to
--Friedrich-Alexander-Universitaet Erlangen-Nuernberg, Erlangen (DE)--.

In the Claims

Claim 6, Column 16, Line 51:
Please change "$S_{b=ss-\alpha}(1-\alpha)*C$" to --$S_b = ss - \alpha / (1 - \alpha) * C$--.

Signed and Sealed this
Ninth Day of July, 2019

Andrei Iancu
*Director of the United States Patent and Trademark Office*